(No Model.) 3 Sheets—Sheet 1.

F. C. M. MEYER.
GRAIN WEIGHING APPARATUS.

No. 339,002. Patented Mar. 30, 1886.

Witnesses:
C. S. Beer
H. W. T. Jenner

Inventor:
Friedrich C. M. Meyer
By Paine & Ladd
Atty's.

(No Model.) 3 Sheets—Sheet 2.

F. C. M. MEYER.
GRAIN WEIGHING APPARATUS.

No. 339,002. Patented Mar. 30, 1886.

Witnesses:
C. T. Beck
H. W. T. Jenner

Inventor.
Friedrich C. M. Meyer
By Paine & Ladd
Atty's.

(No Model.) 3 Sheets—Sheet 3.
F. C. M. MEYER.
GRAIN WEIGHING APPARATUS.
No. 339,002. Patented Mar. 30, 1886.
Fig. 5.
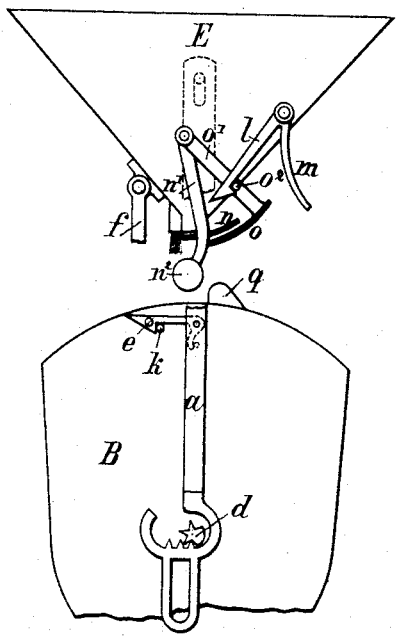
Fig. 7.
Fig. 6.
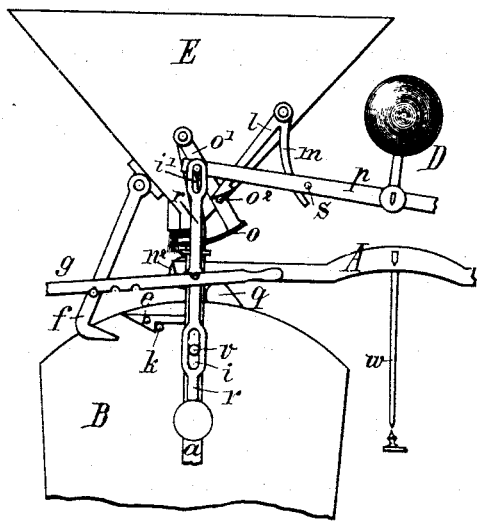
Witnesses,
C. J. Bell
H. W. T. Jenner
Inventor,
Friedrich C. M. Meyer
By Paine & Ladd,
Att'ys.

UNITED STATES PATENT OFFICE.

FRIEDRICH CHRISTOF MARTIN MEYER, OF BUXTEHUDE, PRUSSIA, GERMANY.

GRAIN-WEIGHING APPARATUS.

SPECIFICATION forming part of Letters Patent No. 339,002, dated March 30, 1886.

Application filed October 1, 1885. Serial No. 178,699. (No model.)

*To all whom it may concern:*

Be it known that I, FRIEDRICH CHRISTOF MARTIN MEYER, a subject of the German Emperor, and a resident of Buxtehude, in the Kingdom of Prussia and German Empire, have invented certain new and useful Improvements in Weighing Apparatus, of which the following is a specification.

My invention relates to machines for measuring grain or like material; and the object of my invention is to produce a reliable automatically-acting apparatus by means of which the grain shall be accurately weighed and delivered without waste.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1:
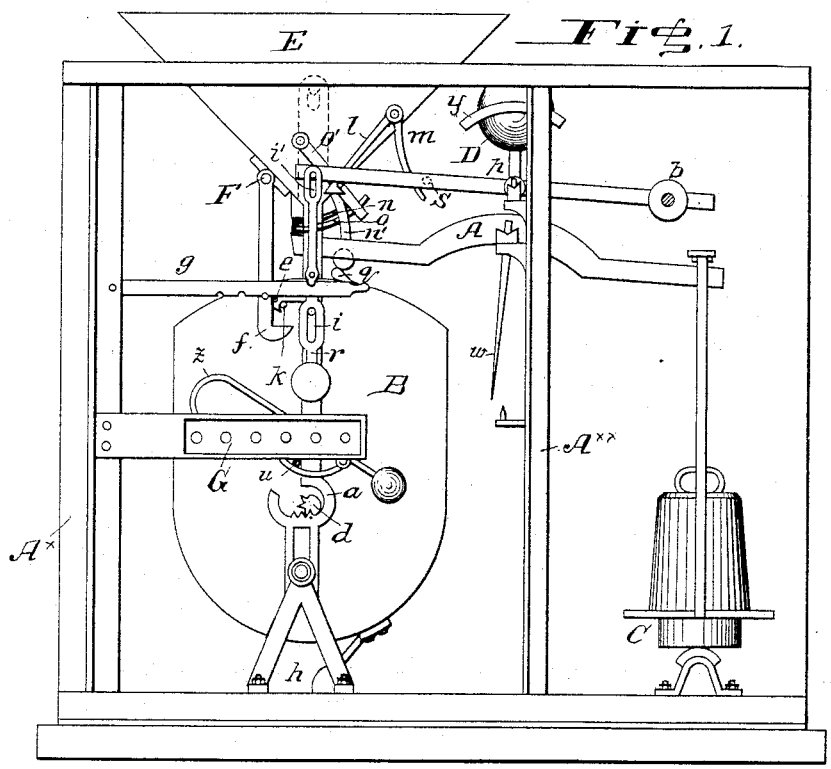
Figure 2:
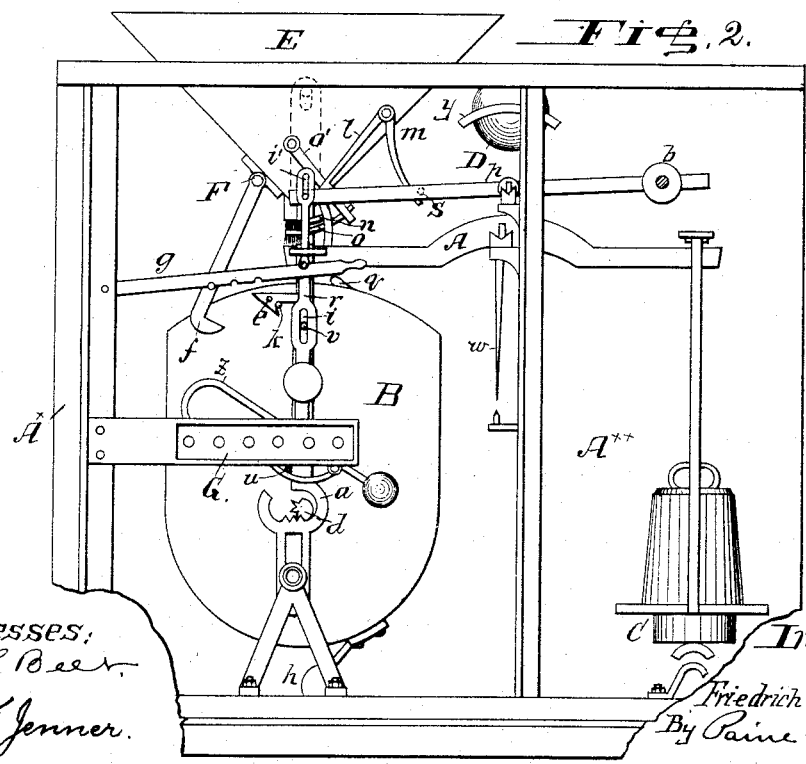
Figure 3:
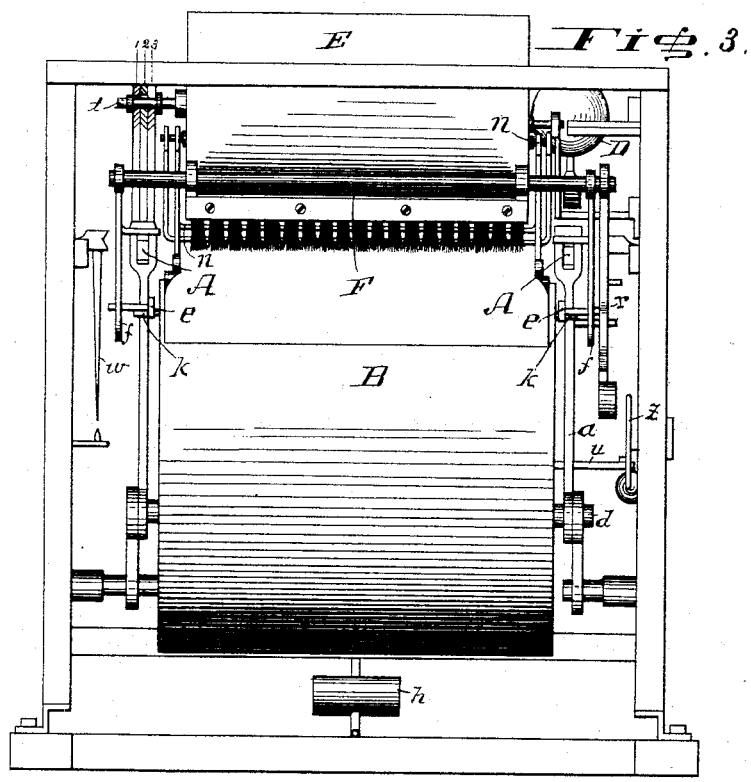
Figure 4:
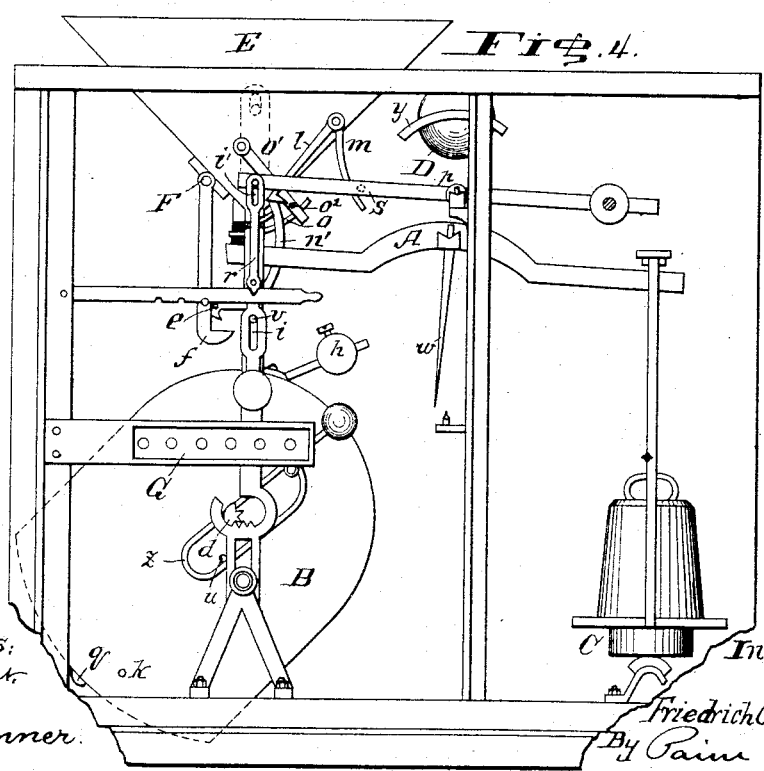

Figure 1 is a side elevation of my improved weighing apparatus, showing the position of the parts at the commencement of the loading of the delivery-receptacle. Fig. 2 is a similar view of the apparatus, showing the position of the parts near the completion of the loading of the delivery-receptacle. Fig. 3 is an end elevation of the apparatus as shown in Fig. 1. Fig. 4 is a similar view of the apparatus, showing the position of the parts at the moment of the dumping of the delivery-receptacle. Figs. 5, 6, and 7 are enlarged detail views.

In the said drawings, $A^\times$ designates a suitable frame-work, and $A^{\times\times}$ an upright portion of the same. Upon this upright portion are pivoted two scale-beams, A and $p$, said levers or beams being arranged the one above the other, as shown. The lever A carries at one end a suspended scale-pan, C, and also at its middle a depending index, $w$.

E designates the feeding-hopper of my improved apparatus, and B designates the delivery-receptacle, said parts being arranged the one above the other, as shown. Receptacle B is supported by toothed bearings $d$ upon the toothed lower ends of hangers $a$, which are in turn supported at their upper ends by the scale beam or lever A. The object of the toothed bearings $d$, which gear into the correspondingly-toothed portion of the hangers $a$, is to give the receptacle B a lateral motion when it turns over, and thereby facilitate the delivery of the grain.

At one side of the receptacle B depends a supplemental hanger, $r$, which is formed with a slot, $i$, within which works a pin, $v$, projecting from hanger $a$. At its upper end the supplemental hanger $r$ is formed with a slot, $i'$. A pin projects from the end of lever $p$, and works back and forth within the said slot $i'$ as the lever $p$ vibrates. This arrangement is such that when the receptacle is empty the pins $v$ of hangers $a$ support the supplemental hanger $r$, and when the receptacle B has been loaded its descent against the action of the weight in scale-pan C carries the pins $v$ to the lower ends of slots $i$, and finally draws down the supplemental hangers $r$, so as to depress beam $p$, for a purpose presently to be described.

In order to insure the proper normal position of receptacle B, it may have a weight, $h$, attached to its bottom, and a hook, $e$, upon hanger $a$, engaging with a stud, $k$, on the receptacle, holds the receptacle in upright position during the operation of loading. A pair of hooks, $f$, suspended from a shaft, F, on the hopper E, rest against studs projecting from hooks $e$, and when a stud upon said hook $f$ is engaged in one of the notches in a lever, $g$, pivoted upon frame $A^\times$, said hook is locked, so as to prevent the action of receptacle B, and consequently render the apparatus inoperative. This position of the apparatus is shown in Fig. 1. By drawing hook $f$ backward and engaging its pin in the opposite notch of lever $g$, the apparatus is rendered free to operate.

Upon hopper E is pivoted a pair of arms, $n'$ $o'$, to the lower ends of which are secured two slides, $n$ $o$, the former slide being slitted, while the latter is solid. The arm $n'$ also carries a counter-weight, $n^2$, while the arm $o'$ carries a stud, $o^2$. A double lever, $l$ $m$, is also pivoted upon the hopper, the end of arm $l$ being hooked to engage the stud $o^2$, and the end of arm $m$ being arranged to engage with the stud $s$ on lever $p$.

A lug or projection, $q$, on receptacle B engages the weight end of arm $n'$, for a purpose hereinafter set forth.

The arm $p$ carries a weight, D, extending upward from the pivot of said arm. This weight D serves to move the lever in either direction as soon as its balance is destroyed, and a sliding counter-weight, $b$, serves to adjust the balance of the said arm $p$ and weight D. A loop, $y$, may be attached to the frame of the device to limit the throw of weight D. A registering device, G, of any suitable character may be provided, and is operated by the pin $u$, which projects from the side of the receptacle B, through the medium of an open counterweighted frame, $z$, which is keyed on the shaft of the units-counter and engages with the said pin $u$. Upon a stud, $t$, at one side of the hopper are hung a series of plates, 1 2 3, having slots of different lengths, and as the receptacle rises and falls these plates act one after another upon the scale-beam A through the medium of the upper end of one of the hangers $a$, and thus steady the vertical movement of the receptacle and the action of the scale-beam A.

The plates 1, 2, and 3 effect a slow rising and lowering motion of the scale-beam A in the following manner: As long as the first flap, $n$, governing the supply, is open, the weight of all three of these plates comes upon the end of hanger $a$, and helps to depress the scale-beam at that end where receptacle B is attached; but when this end sinks down, the weight of the plates 1, 2, and 3 is successively removed from the hanger $a$ as the top of the slot in each one of them comes upon the pin $t$, which then supports them.

Now, the general operation of the device is as follows: When the operation begins, the receptacle B is in upright position, with the scale-pan C depressed and the supplemental hangers supported by the studs on the hangers $a$. The arms $n'$ $o'$, with their slides, are drawn away from the spout of the hopper. As the filling of the receptacle progresses, it is depressed, first releasing the arm $n'$ from projection $q$, and thus partially closing the spout of the hopper by the slitted slide $n$, so that the continued flow of grain is greatly diminished. The receptacle now descends very slowly, until the pins $v$, pressing on the bottom of the slots $i$ in hangers $a$, draw down the supplemental hangers $r$, and finally tilt lever $p$, suddenly closing the slide $o$ and completely cutting off the flow of grain. At this instant the hook $e$ is released from stud $k$ by contact with the hook $f$, which has previously been placed in the position shown in Fig. 2, and the receptacle tilts, thus discharging its load. The pivots $d$ are secured to the receptacle B below its center of gravity when filled with grain, but above it when empty. The instant the load is discharged the preponderance weight of the lower part of the receptacle tilts it up again, and at the same time the bucket rises vertically to its normal position. When the receptacle returns thus to its original position, the projection $q$ takes the weight $n^2$ along with it, and thus moves the arm $n'$ with the flap $n$, which allows more grain to run out of the hopper. As the arms $o'$, bearing the flap $o$, have been resting against the arms $n'$, the flap $o$ will also be opened, and the pin $o^2$ will raise the hook of arm $l$ and automatically engage itself with it. The filling operation again takes place, and the receptacle is automatically filled and emptied, and the number of tiltings of the receptacle recorded.

Having now particularly described and ascertained the nature of my said invention and in what manner the same is to be performed, I declare that what I claim is—

1. In weighing apparatus, the combination of the receptacle B and the projection $q$ with the flaps $n$ and $o$, the arms $n'$ and $o'$, and the weight $n^2$, substantially as and for the purpose specified.

2. In weighing apparatus, the combination of the supports $a$, the slide-piece $r$, provided with slits $i$ and $i'$, the beam $p$, and the pin $s$, with the bell-crank $l$ $m$, projection $o^2$, arms $o'$, and flap $o$, substantially as set forth.

3. In weighing apparatus, the combination of the lever $g$ and the hook $f$ with the pivoted receptacle B, the hook $e$, the scale-beam A, and the scale-pan C, substantially as and for the purpose specified.

4. In weighing apparatus, the combination of the toothed pivots $d$ of the receptacle B with the toothed part of the supports $a$, substantially as and for the purpose specified.

5. In weighing apparatus, the combination of the slotted plates 1 2 3 and the bolt $t$ with the scale-beam A, substantially as and for the purpose specified.

In testimony that I claim the foregoing as my invention I have signed my name, in presence of two witnesses, this 31st day of August, 1885.

FRIEDRICH CHRISTOF MARTIN MEYER.

Witnesses:
ALEXANDER SPECHT,
DIEDRICH PETERSEN.